United States Patent [19]
Watts

[11] 3,794,074
[45] Feb. 26, 1974

[54] MIXER TAPS

[75] Inventor: Horace Watts, Pinner, England

[73] Assignee: H. E. D. E. Limited, Middlesex, England

[22] Filed: Sept. 20, 1972

[21] Appl. No.: 290,495

[52] U.S. Cl. ............................................ 137/625.4
[51] Int. Cl. ........................................... F16k 11/00
[58] Field of Search .......... 137/625.4, 625.41, 636.3

[56] References Cited
UNITED STATES PATENTS

| | | | |
|---|---|---|---|
| 3,526,250 | 9/1970 | Miller | 137/625.4 |
| 3,435,849 | 4/1969 | Von Corpon | 137/625.4 |
| 3,623,510 | 11/1971 | Hare et al. | 137/636.3 |
| 3,324,884 | 6/1967 | Dornaus | 137/636.3 X |
| 3,372,710 | 3/1968 | Miller | 137/636.3 |
| 3,417,783 | 12/1968 | Manoogian et al. | 137/625.41 |
| 3,533,436 | 10/1970 | Parkison | 137/625.4 X |
| 3,693,660 | 9/1972 | Wheelock | 137/625.4 |

*Primary Examiner*—Samuel Scott

[57] ABSTRACT

A mixing valve comprising a chamber having a surface defining a valve seat, hot and cold water inlets opening into said chamber at said seat, a valve member disposed in said chamber and slidably associated with said seat and having passage means therein movable into and out of registry with said inlets, a lever having one end interconnected to the valve member and a journal intermediate the ends mounted in a journal bearing spaced from said seat for swinging movement in a single plane extending normal to said seat so as to move the valve member in a straight path aligned with said single plane and for rotation about the longitudinal axis so as to rotate the valve member about an axis fixed with respect to the valve member and always lying substantially in said single plane, the lever and/or the valve member being guided between opposed parallel plane surfaces lying normal to the seat respectively at opposite sides of said single plane, and at least one sealing ring in engagement with the journal for sealing said journal with respect to said journal bearing to prevent water leaking along the spindle from the chamber to atmosphere.

4 Claims, 6 Drawing Figures 3,794,074

MIXER TAPS

The invention relates to mixing taps or valves for combined hot and cold water supplies of the kind having a single handle movable in two modes so as to select or mix the hot and cold water and to control the volume thereof.

The invention provides a mixing valve comprising a chamber having a surface defining a valve seat, hot and cold water inlets opening into said chamber at said seat, a valve member disposed in said chamber and slidably associated with said seat and having passage means therein movable into and out of registry with said inlets, a lever having one end interconnected to the valve member and a journal intermediate the ends mounted in a journal bearing spaced from said seat for swinging movement in a single plane extending normal to said seat so as to move the valve member in a straight path aligned with said single plane and for rotation about the longitudinal axis so as to rotate the valve member about an axis fixed with respect to the valve member and always lying substantially in said single plane, the lever and/or the valve member being guided between opposed parallel plane surfaces lying normal to the seat respectively at opposite sides of said single plane, and at least one sealing ring in engagement with the journal for sealing said journal with respect to said journal bearing to prevent water leaking along the spindle from the chamber to atmosphere.

A specific embodiment of the invention and various alternative forms thereof will now be described by way of example only and with reference to the accompanying drawings, of which:

Figure 1:
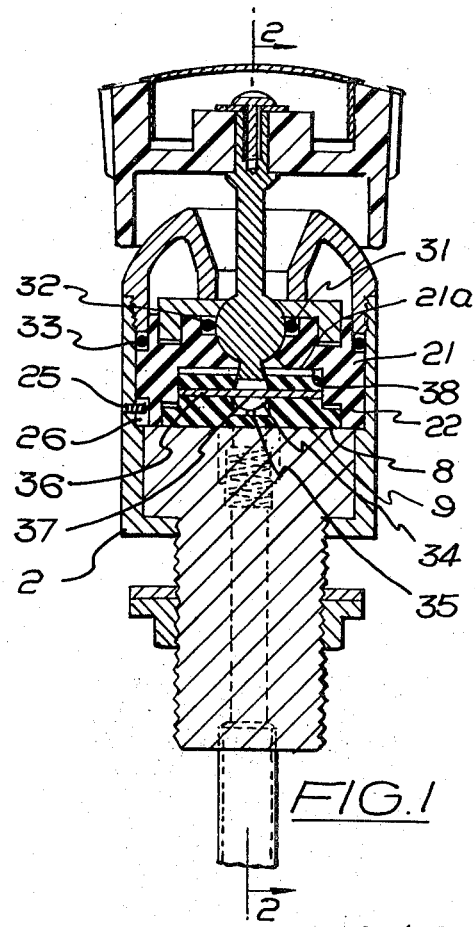
FIG. 1 is a sectional elevation through a first embodiment of the invention.
Figure 2:
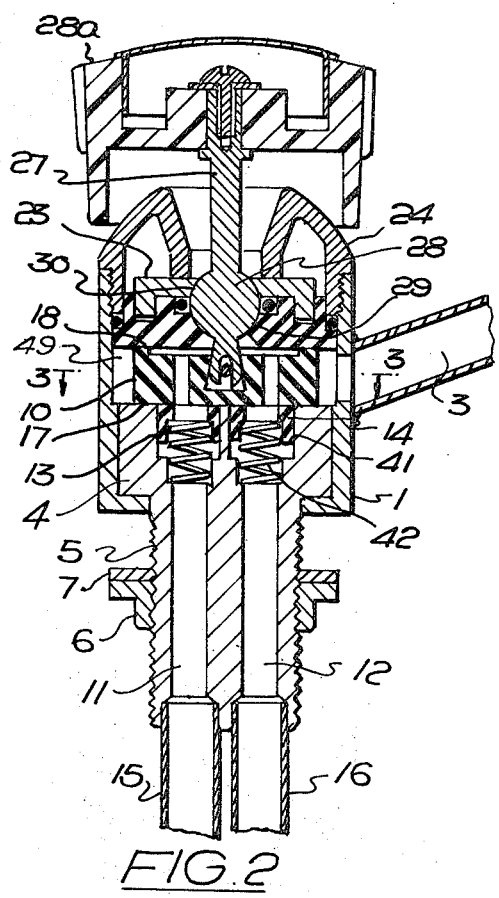
FIG. 2 is a sectional elevation taken on line 2—2 in FIG. 1.
Figure 3:
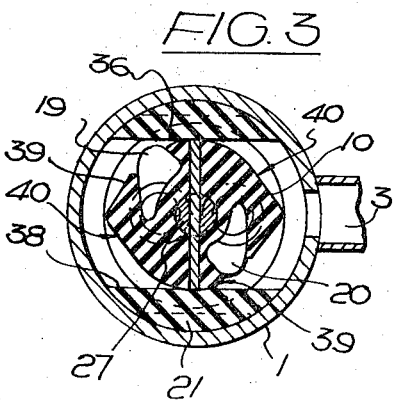
FIG. 3 is a cross section taken on line 3—3 in FIG. 2.

FIGS. 1 to 3 show a first embodiment of the invention wherein the valve body 1 comprises a cylindrical casing 2, a discharge spout 3 which is brazed to casing 2, and an insert 4 which is cemented or soldered into casing 2. The insert 4 is provided, at its lower end, with a screw-threaded extension 5, which in use projects through the tap hole of a sink or the like, and a backnut 6 and washer 7 are provided on the screwthreaded extension 5 for clamping the unit in position on the sink.

At its upper end the insert 4 has a flat surface 8 which forms a valve seat 9 for a movable valve member 10. Inlet passages 11, 12 respectively for hot and cold water extend longitudinally in the insert 4 and provide, at the valve seat 9, a pair of inlet ports 13, 14. Inlet pipes 15, 16, for connecting the valve to hot and cold water supplies, are brazed into the bottom end of the insert 4 so that they connect respectively with the passages 11, 12.

The valve member 10 has upper and lower flat surfaces 17, 18 respectively which are parallel to each other, and lower surface 18 has two passages 19, 20 opening therefrom which co-operate respectively with the inlet ports 13, 14 in valve seat 9 to control the flow of water through the valve, in a manner to be described.

An inner mounting member 21 overlies the valve member 10 to confine it against the valve seat 9 and is provided with a pair of lugs or extensions 22 which extend respectively at opposite sides of the valve member and abut the valve seat 9. The space between the extensions 22 constitutes a chamber 40 within which the valve member is located, said chamber having a flat wall surface, that is to say the flat surface 8 of the insert 4, which constitutes a valve seat for the valve member. The lugs 22 hold the undersurface 21a of mounting member 21 in spaced relation with the valve seat 9 whereby the valve member 10 is kept slidably associated with said seat and prevented from tilting. An outer mounting member 23 overlies the inner member 21, and the two members 21, 23 are clamped together and against the valve seat 9 by a cover cap 24 which is screwed into casing 2. In order to ensure correct angular orientation of the inner mounting member 21 with the inlet ports 13, 14, a pin 25 is provided in casing 2 and engages a complementary slot 26 formed in the inner mounting member 21.

A lever 27 has one end interconnected to the valve member 10 and extends therefrom through the mounting members 21, 23 and through the cover cap 24 for connection to an operating handle 28a. Intermediate the ends the lever 27 is provided with a part-spherical journal 28 which engages a part-spherical seating 29 formed in the inner mounting member 21 and an oppositely directed part-spherical seating 30 formed in the outer mounting member 23, whereby the lever journal 28 is journalled in a bearing defined by the seatings 29, 30 and held therein in spaced relation with the valve member 10.

A sealing ring 31 is trapped between members 21, 23 and positioned in an annular recess 32 formed in inner bearing member 21, and bears against the spherical journal 28 in sliding sealing relation to prevent water leaking along the lever 27 past the journal to atmosphere. A further sealing ring 33 provided between the inner mounting member 21 and bore of casing prevents leakage of water past the periphery of inner mounting member 21 to atmosphere The lever 27 has a part-spherical end 34 which engages a central recess 35 in the valve member 10, and a pin 36 fixed in the valve member 10 and extending across recess 35 engages a slot 37 in the part-spherical end 34 of the lever. (The slot is shown open ended to facilitate assembly, but a closed slot would serve the same purpose and might be advantageous in the event it proves desirable to tie the lever and valve member together to facilitate withdrawal of the valve member from the casing. Other methods of interconnecting the lever to the valve member are also possible, for example the pin 36 could be press fitted into a hole in the spherical end 34 of the lever so that it projects outwardly therefrom and engages axially extending complimentary slots or grooves formed in the valve member.)

The lugs 22 of the inner mounting member 21 respectively provide a pair of opposed parallel plane surfaces 38 which constitute side walls of the chamber 40 and engage a cam surface 39 formed on the valve member 10 to guide the valve member laterally in a straight path, and the cam surface 39 has converging side faces 40 which respectively engage the plane surfaces 38 to limit rotation of the valve member to between two angularly spaced positions. (See FIG. 3.)

The arrangement is such that swinging of the lever 27 in a single plane normal to the valve seat 9 effects movement of the valve member 10 laterally in a straight path aligned with said single plane, and rotation of the lever about its axis rotates the valve member 10. The inter-connection of the lever with the valve member provides a modified form of "Hookes" coupling which allows the valve member to oscillate with respect to the lever when rotated by the lever in positions other than the medial position shown in the drawings, in which latter position the valve member will rotate without oscillating relative to the lever.

The inlet ports 13, 14 are counterbored to receive a pair of tubular sealing rings 41 of rubber or other suitably resilient material. Springs 42 urge the sealing rings 41 into intimate sliding and sealing contact with the flat underside 17 of the valve member 10, and the valve member is thereby biased into sliding non-sealing contact with the inner bearing member 21. The sealing rings 41 are a sliding sealing fit in the counterbore so that when the openings 19, 20 in the valve member 10 are moved out of registry with the inlet ports 13, 14 the valve is shut off.

In FIGS. 1 to 3 the openings, 19, 20 in the valve member 10 are shown equally in register with the inlet ports 13, 14 whereby the valve would be flowing equal amounts of hot and cold water. By swinging the lever in said single plane either of the openings 20, 21 can be brought into full register with the associated inlet port whereby the other opening is moved fully out of register with its associated inlet port and whereby the valve would be flowing all hot water or all cold water respectively. The valve member can be rotated from any of the fully open positions mentioned, to the fully closed position. Thus the temperature of the discharge is controlled on swinging of the lever and the volume thereof, including shut-off, is controlled on rotation of the lever, and said temperature and volume may be controlled individually.

Figure 4:
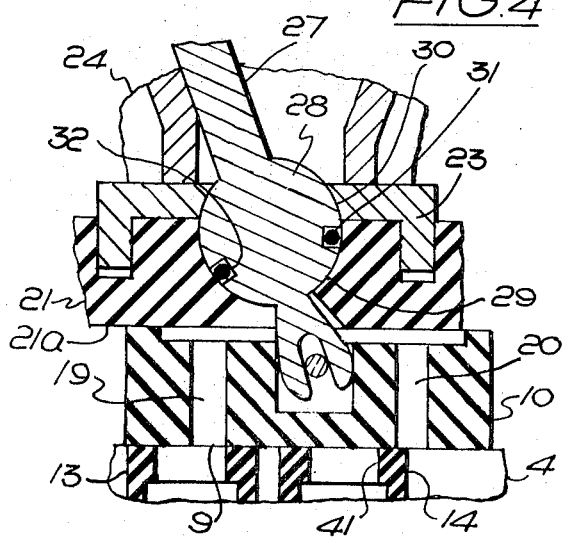
FIG. 4 is a sectional detail view of a part of the mechanism shown in FIG. 2 and drawn to a somewhat larger scale than FIG. 2.

FIG. 4 illustrates the positioning of the O-ring seal 31 in an alternative manner to that shown in FIGS. 1 to 3. Here the seal 31 is located in an annular recess 32 formed in the part-spherical journal 28 of the lever 27 and bears against the part-spherical seat 29 in the inner mounting member 21 in sliding sealing relation. In all other respects the valve is identical to the valve shown in FIGS. 1 to 3.

Figures 5, 6:
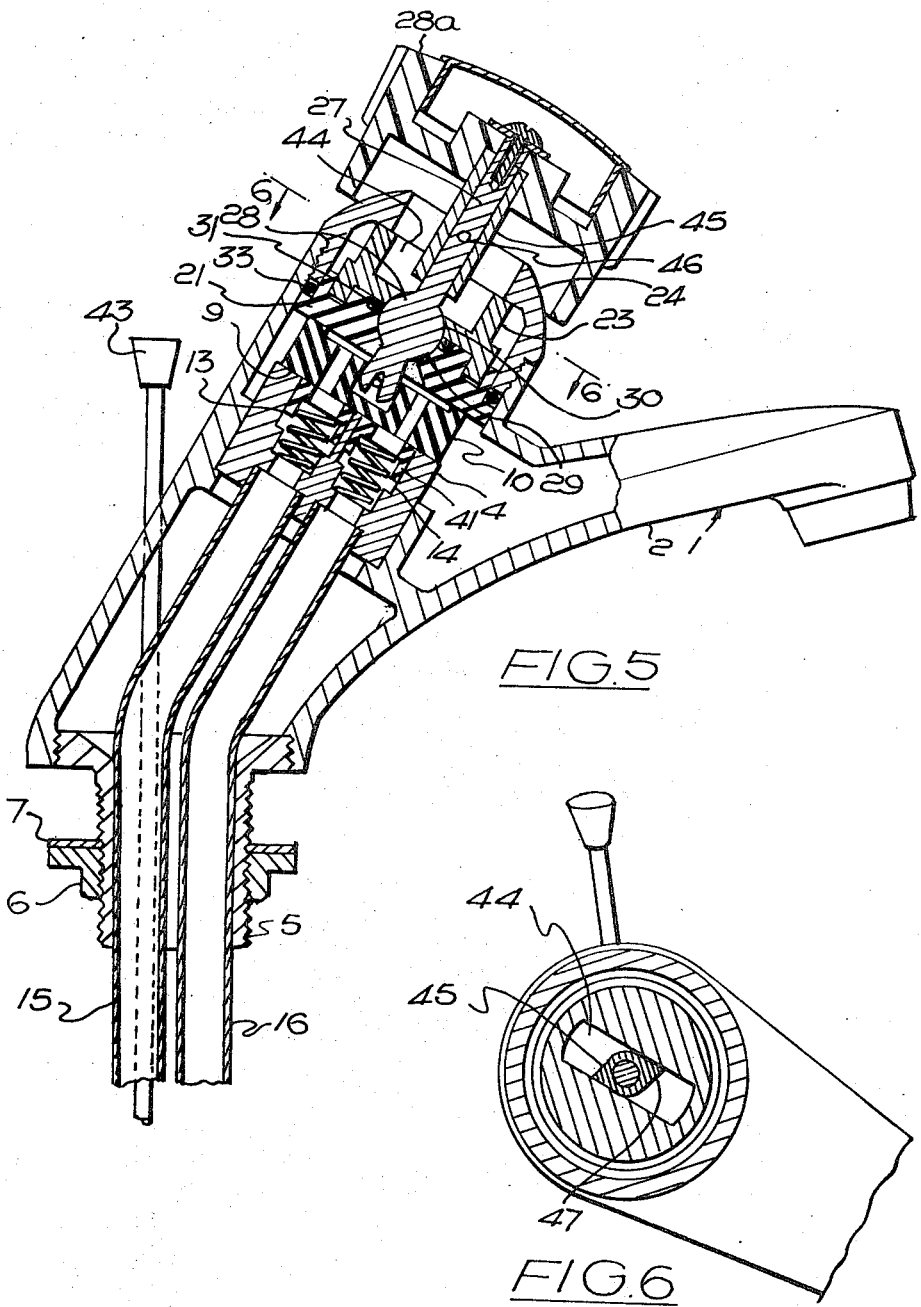
FIG. 5 is a sectional elevation through a second embodiment of the invention.
FIG. 6 is a cross section taken on line 6—6 in FIG. 5.

FIGS. 5 and 6 show a second embodiment of the invention which is similar in certain respects to the valve shown in FIGS. 1 to 3 but which differs therefrom in certain other respects, and like items carry like reference numbers.

The valve body 1 comprises a die cast casing 2 having an insert 4 secured thereinto by cementing or like means. As in the embodiment described above, the insert provides a flat valve seat 9 with counterbored inlet ports 13, 14 having spring loaded tubular seals 41 therein which co-operate with a valve member 10, and the valve member 10 is slidably associated with the valve seat 9 for controlling the flow of water through the valve in the manner previously described for FIGS. 1 to 3. Inlet pipes 15, 16 brazed into the underside of the insert 4 communicate respectively with the inlet ports 13, 14 and pass through the base of the casing 2 and through an externally screwthreaded hollow extension 5 for interconnection in use to hot and cold water supplies, and extension 5 has a backnut 6 and washer 7 mounted thereon for clamping the unit to a sink or the like. A pullrod 43 is provided and extends vertically through the casing 2 and through the hollow extension 5 side by side with the inlet pipes 20, 21 for interconnection in use to the drain plug of a washbasin (not shown) in a known manner.

An inner mounting member 21, for mounting a lever 27, overlies the valve member 10 to confine it against the flat valve seat 9 and to prevent it tilting. An outer mounting member 23 in turn overlies the mounting member 21 and is prevented from moving axially outwards by a cover cap 24 screwed to the casing 2. The space between the insert 4 and the inner mounting member 21 in this case constitutes the chamber within which the valve member is located, said chamber having a flat wall surface, that is to say the flat top surface of the insert 4, which constitutes a valve seat for the valve member.

The lever 27 has a spherical journal 29, intermediate its ends, which is journalled for rotation in spherical seatings 29, 30 provided respectively by inner mounting member 21 and outer mounting member 23. As in the embodiment described above, an O-ring 31 positioned adjacent the seat 29 in a recess formed in the mounting member 21 seals the spherical journal 28 of the lever 27 with respect to the journal bearing (as defined by the seatings 29, 30), and a further O-ring 33 is interposed between the mounting member 23 and the casing 2 to prevent leakage to atmosphere past the outer periphery of the mounting member 23.

As is more clearly shown in FIG. 6 the outer mounting member 23 is provided with a radially elongated slot 44 through which the lever 27 extends for connection to an operating handle 28a. The lever 28 includes a sleeve 45 of somewhat quadrate or rhomboidal cross section which extends into the slot 44 in the mounting member 23 from the handle 28a, the sleeve and the lever being pinned together with a pin 46. The cross sectional shape of the sleeve 45 provides a pair of ears 47 which engage the sides of the slot 44 to limit the rotation of the valve member 10 to between two angularly spaced positions corresponding to the "on" and "off" positions of the valve.

The lever extends downwards through the bore 48 of the mounting member 21, and interconnects with the valve member 10 in the manner described earlier. Thus, swinging of the lever 27 in the single plane defined by the parallel sidewalls of the elongate slot 44 causes the valve member 10 to move back and forth in a straight path aligned with said plane while rotation of the lever 27 causes the valve member 10 to rotate about an axis normal to the valve seat.

The inner mounting member 21 is preferably provided with extensions (not shown) similar to the extensions 22 provided on mounting member 21 in the first described embodiment although such extensions need not here employ parallel plane surfaces for guiding the valve member. The extensions 22 are not here strictly necessary but such an arrangement is desirable because it allows greater dimensional tolerances to be applied to the various parts than otherwise would be the case and minimises the possible tolerance build up inherent in for example arrangements wherein either the extensions are dispensed with or are not made to abut the valve seat. The latter two arrangements could result in excessive clearance occurring between the valve member and the surfaces between which it is confined unless tolerances were kept unpractically small. In a known valve of a similar kind such clearance is adjusted on installation and necessitates a special key being supplied to the customer with each valve.

By employing extensions 22 the "float" of the valve member 10 between the surfaces confining it (i.e. 9 and 21 respectively) is determined by the tolerances allowed on two dimensions only, namely the height of the valve member 10 and the length of the extensions 22, so that the allowable "float" of the valve member can be pre-determined to ensure correct functioning. Furthermore the "play" of the lever journal in its bearing can also be pre-determined independently of the "float" allowed the valve member, so that friction is also kept to a minimum.

Various other arrangements are also possible, for example rotation limiting means could be provided at the valve member and guidance means at the lever, or vice versa, or the lever and the valve member could both be provided with rotation limiting means and guidance means.

It is not intended that the invention be limited to the embodiments described and illustrated herein. For example the invention may be employed in the design of various fixtures such as a kitchen sink valve wherein the valve member is moved by a lever and is provided with a swivel outlet nozzle, or a bath/shower combination valve having two outlets and known diverter means for routing water to either outlet on demand, or a bidet valve wherein the outlet exists from the base surface side by side with the inlet conduits.

It is to be understood that the wall surface of the chamber which constitutes the valve seat need not necessarily be quite flat. It could be made slightly spherical, for example, the centre of curvature of the spherical wall surface preferably being the centre of curvature of the part-spherical seating of the bearing in which the lever is mounted. In this case the valve member would have a surface of complimentary shape.

What I claim and desire to secure by Letters Patent is:-

1. A single handle mixing valve including a chamber having a wall surface constituting a valve seat; hot and cold water inlets opening into said chamber at said surface; a valve member disposed in said chamber and slidably associated with said valve seat; passages in said valve member movable into and out of registry with said water inlets; a lever having one end interconnected with the valve member; means for guiding the lever in a single plane for movement of said valve member by said lever in a straight line; means for transmitting rotation from said lever to said valve member for rotating said valve member by said lever, said means being constituted by a sleeve which is carried by the lever, said sleeve having radially extending ears which engage the parallel surfaces which guide said lever in a single plane whereby the abutment of the ears with said parallel surfaces limits the rotation of the lever; means for mounting said lever intermediate its ends, said means including a bearing having a part-spherical journal engaging a part-spherical seating; and sealing means interposed between said part-spherical journal and said part-spherical seating for preventing the leakage of water from the chamber.

2. A single handle mixing valve according to claim 1, in which the sealing means which are provided between the part-spherical journal and its seating are constituted by a sealing ring disposed in an annular recess in the seating to be located in a plane containing the center of the part-spherical journal and to bear against said journal in sealing relation.

3. A single handle mixing valve including a chamber having a wall surface constituting a valve seat; hot and cold water inlets opening into said chamber at said surface; a valve member disposed in said chamber and slidably associated with said valve seat; passages in said valve member movable into and out of registry with said water inlets; a lever having one end interconnected with the valve member; means for transmitting rotation from said lever to said valve member for rotating said valve member by said lever, the valve member being provided with converging side faces which can engage parallel plane surfaces constituting side walls of the chamber to limit rotation of the valve member to between two angularly spaced positions and to constitute means for guiding said valve member and lever in a single plane for movement of said valve member by said lever in a straight line; means for mounting said lever intermediate its ends, said means including a bearing having a part-spherical journal engaging a part-spherical seating; and sealing means interposed between said part-spherical journal and said part-spherical seating for preventing the leakage of water from the chamber.

4. A single handle mixing valve according to claim 3, in which the sealing means which are provided between the part-spherical journal and its seating are constituted by a sealing ring disposed in an annular recess in the seating to be located in a plane containing the center of the part-spherical journal and to bear against said journal in sealing relation.

* * * * *